United States Patent Office 3,031,383
Patented Apr. 24, 1962

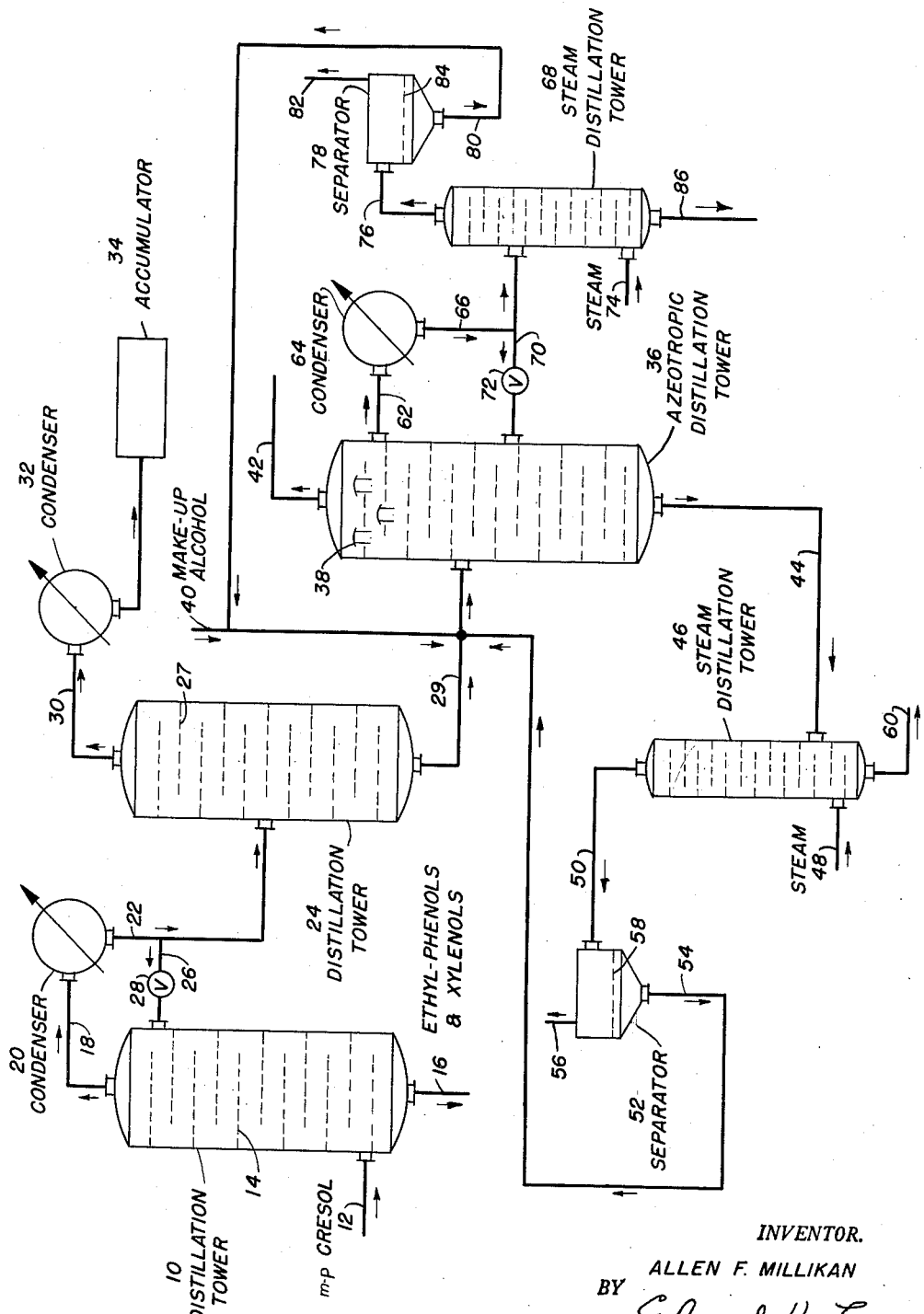

3,031,383
PURIFICATION OF m-CRESOL FROM MIXTURES OF m-CRESOL AND p-CRESOL
Allen F. Millikan, Crystal Lake, Ill., assignor to The Pure Oil Company, Chicago, Ill., a corporation of Ohio
Filed June 26, 1959, Ser. No. 823,103
10 Claims. (Cl. 202—42)

This invention relates to a method of separating and purifying m-cresol from mixtures of m- and p-cresols and relates, more particularly, to an azeotropic distillation process using benzyl alcohol as the azeotrope-former.

Commercial cresols obtained as by-products from the destructive distillation of coal contain, in crude form, admixed phenol as well as several xylenols and ethylphenols. Differences in boiling points allow the separation of phenol and o-cresol and also the xylenols from the commercial mixture. The similarities in boiling points of m-cresol (B.P. 202.8° C.) and p-cresol (B.P. 201.8° C.) make their separation by fractional distillation impractical. For this reason, other methods of separation have been employed including adduct formation, i.e., the oxalic acid method, the urea method, the sodium acetate method and the phenol method, and others, including alkylation, sulfonation, etc.

In accordance with this invention, it has been found that m-cresol can be separated from mixtures containing p-cresol by azeotropic distillation with benzyl alcohol. This result is unusual because the known azeotropes of m-cresol and benzyl alcohol and p-cresol and benzyl alcohol (B.P. 205.8° C.) boil within about 0.3° C. of each other, that is, closer than the cresols themselves, and it would not be expected that a separation would occur.

Accordingly, it becomes a primary object of this invention to provide a process for separating m-cresol from mixtures containing same.

Another object of this invention is to provide a method of separating and purifying m-cresol from mixtures containing p-cresol.

Another object of this invention is to provide a method of separating and purifying m-cresol from mixtures with p-cresol by azeotropic distillation.

A further object of this invention is to provide a method of separating m-cresol from p-cresol by distillation in the presence of benzyl alcohol.

Another object of this invention is to provide a method of separating m-cresol from p-cresol by azeotropic distillation in the presence of benzyl alcohol.

These and other objects of the invention will become apparent or be described as the specification proceeds.

The drawing is a flow sheet showing the steps in the overall process. The following examples and experiments are given to illustrate the invention:

A mixture consisting of 29% v. p-cresol, 29% v. m-cresol, and 42% v. benzyl alcohol was distilled at 30 mm. Hg at 6/1 reflux ratio in a vacuum distillation still which had an efficiency of about 10 theoretical plates. Representative distillate fractions and the still residue were analyzed by means of infrared spectrometry for m-cresol, p-cresol, and benzyl alcohol content. An abbreviated log of the distillation and analyses was as follows:

*Table I*

| Fraction | Col. hd. temp., °C. (conv. to 760 mm.) | Vol. yield data | | | Infrared analysis | | |
|---|---|---|---|---|---|---|---|
| | | Ml. | Percent | Cum., percent | Percent v. m-cresol | Percent v. p-cresol | Percent v. benzyl alcohol |
| IBP | [1] 100 | | | | | | |
| 1 | 205.0 | 26.0 | 5.0 | 5.0 | | | |
| 2 | 205.6 | 26.0 | 5.0 | 10.0 | 48 | 52 | ([2]) |
| 3 | 205.7 | 26.0 | 5.0 | 15.0 | 49 | 51 | ([2]) |
| 4 | 206.5 | 26.0 | 5.0 | 20.0 | 49 | 51 | ([2]) |
| 5 | 207.3 | 26.0 | 5.0 | 25.0 | | | |
| 6 | 209.9 | 26.0 | 5.0 | 30.0 | 44 | 49 | 7 |
| 7 | 211.9 | 26.0 | 5.0 | 35.0 | | | |
| 8 | 212.2 | 27.0 | 5.2 | 40.2 | 27 | 31 | 42 |
| 9 | 212.2 | 31.0 | 5.9 | 46.1 | 22 | 28 | 50 |
| 10 | 212.2 | 26.5 | 5.0 | 51.1 | 20 | 23 | 57 |
| 11 | 212.3 | 27.0 | 5.2 | 56.3 | 20 | 23 | 57 |
| 12 | 212.3 | 26.3 | 5.0 | 61.3 | 19 | 20 | 61 |
| Residue | 212.3+ | 188.4 | 36.2 | 97.5 | 22 | 15 | 63 |
| Loss | | | 2.5 | 100.0 | | | |

[1] Part of Fraction #1 was water; evidently the technical grade cresols used contained some water.
[2] Not detected.
NOTE.—The analysis was estimated to be accurate to within ±5% of the amount reported.

According to "Azeotropic Data," No. 6 of the Advances in Chemistry Series (ACS, June 1952), it is stated that 61% benzyl alcohol forms an azeotrope with 39% m-cresol and the boiling point of the azeotrope is 207.1° C.; and that 62% benzyl alcohol forms an azeotrope with 38% p-cresol, which azeotrope has a boiling point of 206.8° C. It is apparent that the boiling points of the azeotropes are even more similar than the boiling points of the cresols. Hence, referring to Table I, it would not be expected that the m-cresol/p-cresol ratio could be increased from 50/50 to about 60/40 by this distillation. The first fractions, 1–6, indicate no azeotrope formation during the initial stages of the process. These initial fractions represent the course of the distillation without the benzyl alcohol azeotrope formation. The azeotrope began to form and distill at about 211.9° C., carrying with it a predominance of the p-cresol and leaving behind a higher concentration of m-cresol. The various analyses of the fractions must be compared with the composition of the residue to observe the significance of the data. The residue contains about 60% m-cresol.

These experiments were repeated using 23.3% m-cresol, 15.5% p-cresol and 61.2% benzyl alcohol and the conditions of distillation in the foregoing example repeated. The results are shown in Table II.

Table II

| Fraction | Col. hd. temp., °C. (conv. to 760 mm.) | Vol. yield data | | | Infrared analysis | | |
|---|---|---|---|---|---|---|---|
| | | Ml. | percent | Cum., percent | Percent v. m-cresol | Percent v. p-cresol | Percent v. benzyl alcohol |
| IBP | 205 | | | | | | |
| 1 | 208 | 30 | 5 | 5 | | | |
| 2 | 210 | 30 | 5 | 10 | 26 | 23 | 51 |
| 3 | 210 | 30 | 5 | 15 | | | |
| 4 | 210 | 30 | 5 | 20 | | | |
| 5 | 210 | 30 | 5 | 25 | 23 | 19 | 58 |
| 6 | 210 | 30 | 5 | 30 | | | |
| 7 | 210 | 30 | 5 | 35 | | | |
| 8 | 210 | 30 | 5 | 40 | 22 | 17 | 61 |
| 9 | 210 | 30 | 5 | 45 | | | |
| 10 | 210 | 30 | 5 | 50 | | | |
| 11 | 210 | 30 | 5 | 55 | 22 | 15 | 63 |
| 12 | 210 | 30 | 5 | 60 | | | |
| 13 | 210 | 30 | 5 | 65 | | | |
| 14 | 210 | 30 | 5 | 70 | 23 | 13 | 64 |
| 15 | 210 | 30 | 5 | 75 | | | |
| 16 | 210 | 30 | 5 | 80 | 24 | 12 | 64 |
| Residue | | | 20 | 100 | 27 | 6–10 | 65 |

NOTE.—Accuracy of analysis estimated at ±5% of amount reported.

In Table III, below, the results of Table II are re-evaluated. Here the m-cresol content of the residue is considered as if the distillation had been halted at different points from fraction #10 on.

Table III

| Residue after fraction | Percent residue of charge | Infrared analysis, benzyl alcohol-free basis, percent v. m-cresol |
|---|---|---|
| 10 (residue plus 11, 12, 13, 14, 15, 16) | 50 | 68.5 |
| 11 (residue plus 12, 13, 14, 15, 16) | 45 | 69 |
| 12 (residue plus 13, 14, 15, 16) | 40 | 70.5 |
| 13 (residue plus 14, 15, 16) | 35 | 72 |
| 14 (residue plus 15, 16) | 30 | 73.5 |
| 15 (residue plus 16) | 25 | 75 |
| 16 (residue) | 20 | 77 |

The results shown in Table III represent the minimum improvement that can be obtained by this invention. The process of this second example was at low plate efficiency in the column, but with the benefit of 6/1 reflux ratio. It is apparent that by using a more efficient column and a greater reflux ratio, the separation would be greatly improved. The process of this invention is capable of producing fractions having a concentration of m-cresol above 70%.

In carrying out the invention in its most specific aspects, commercial mixtures of m- and p-cresols, consisting of approximately 60% m-cresol and 40% p-cresol, are charged along with between about 1.0 to 2.0, and preferably about 1.5, times the volume of benzyl alcohol, to a vacuum distillation unit of at least ten theoretical plates efficiency, and at a reflux ratio between about 1/1 and 100/1. The distillation is conducted at between about 100 and 5 mm. Hg pressure. The distillate fractions richer in p-cresol are collected, and a residue richer in m-cresol is recovered. The distillation is carried out until a residue having the desired purity of m-cresol is obtained. By using a greater reflux ratio, i.e., a ratio of about 10/1 to 100/1, and increasing the tower efficiency, residues containing m-cresol having a purity as high as 98% can be obtained by this process. For practical commercial operation, the columns should be designed to obtain m-cresol purities of about 70–75% v.

The benzyl alcohol and cresols may contain water up to about 3.5% v. The water content will not have any particularly deleterious effect as it will be distilled off as a water-benzyl alcohol azeotrope (B.P. 99.9° C., containing 91% water) before the benzyl alcohol, cresols, or their azeotropes with each other. (Neither cresol forms a water azeotrope.) The benzyl alcohol is easily recovered from the overhead and residual fractions by steam distillation. In this operation, water is added in amounts up to 60% v. and the benzyl alcohol distills off as an azeotrope with water, leaving the purified m-cresol or p-cresol behind. The recovered benzyl alcohol is recycled to the initial distillation.

Referring to the drawing, a crude commercial mixture of m-cresol and p-cresol is introduced into distillation tower 10 via line 12. Tower 10 is equipped with plates 14 and is designed to make a rough cut of the crude mixture into a bottom or slop fraction, comprising ethylphenols and xylenols, coming off at line 16, and an overhead fraction comprising the main portion of the m-cresol and p-cresol, along with o-cresol and phenol, passing through line 18 into condenser 20. The condensed overhead is taken from condenser 20 through line 22 into a second distillation tower 24. A portion of the overhead from line 22 may be passed through line 26, controlled by valve 28, into tower 10 as reflux.

Distillation tower 24 is equipped with plates 27 and is designed to prepare a bottoms fraction comprising m- and p-cresol, substantially free of phenol and o-cresol, which is taken off at bottom line 29. An overhead fraction, comprising the main portion of phenol and o-cresol and having a boiling range of about 180° C. to 200° C., is taken off at line 30, transformed to the liquid state in condenser 32, and collected in accumulator 34. The bottoms fraction, consisting essentially of m- and p-cresol and boiling between about 201° C. to 203° C., is conveyed by line 29 to azeotropic distillation tower 36 equipped with bubble-cap trays 38. The incoming fraction is mixed with about 1 to 3 volumes of benzyl alcohol introduced through line 40 into line 29. Any trace amounts of water are taken off at overhead line 42, and a bottoms fraction, or residue, containing the desired increased concentration of m-cresol is removed at line 44. This product passes to steam distillation tower 46 wherein steam, introduced at line 48, causes the distillation of a benzyl alcohol-water azeotrope which is removed at line 50 and passed to separator 52. In separator 52, upon cooling, the azeotrope separates into a lower benzyl alcohol layer which is taken off at line 54 and recycled back to incoming feed-line 29, and on to tower 36, and an upper water layer drawn off at line 56. The interface between the water and the benzyl alcohol in separator 52 is indicated at 58. The purified m-cresol product is removed from tower 46 at line 60.

The azeotropic distillation in tower 36 produces an overhead mixture containing a substantial quantity of p-cresol-benzyl alcohol azeotrope, which is taken off at line 62 and passed through condenser 64. The condensed overhead passes through line 66 to steam distillation tower 68. A portion of this azeotrope may be recycled as reflux to tower 36 via line 70, controlled by valve 72.

In steam distillation tower 68, as in tower 46, steam introduced at line 74 causes the distillation of a benzyl alcohol-water azeotrope which is removed at line 76 and passed to separator 78. In separator 78 the lower phase comprising benzyl alcohol is drawn off at line 80 and recycled back to line 29, and the upper water phase is drawn off at line 82. The interface between the water and benzyl alcohol within separator 78 is indicated at 84. A bottoms product, comprising substantially pure p-cresol, is removed at line 86.

The foregoing description of the process of this invention is merely illustrative and not to be considered as limiting thereon. For example, it is not necessary to take a fraction, as illustrated by the bottoms product in line 29 passing to tower 36, unless a final purity greater than about 80% is desired in the m-cresol product withdrawn through line 60. Thus the crude mixture entering distillation tower 10 at line 12 may be introduced at line 29 without previous preparational distillation. In this instance, the purity of product 60 generally is about 70 to 75%. The crude m- and p-cresol-containing mixture used may contain any ratios of these two cresols. For example, commercially-available crude mixtures contain about 60% m-cresol and 40% p-cresol, the amount of m-cresol in these mixtures frequently varying from 50 to 70%. It is to be understood that the invention is not restricted to any particular composition of starting materials and may be applied to widely different compositions.

The benzyl alcohol used in carrying out the process of this invention may be technical grade benzyl alcohol having a boiling range of 200–210° C. with 95% boiling at 205.8±2.0° C. It is preferred that FFC (free from chlorine) grade benzyl alcohol having a boiling range of 204–207° C., with 95% boiling at 205.8±0.5° C., be used. As far as can be determined from the experiments carried out in applying the instant process to various m-cresol and p-cresol mixtures, the separation is not influenced adversely by the presence of trace amounts of water, or even up to as much as about 3.5% by volume of water, the extent of water solubility in benzyl alcohol.

In general, the overhead temperature used in the distillation in tower 10 should be about 77° C. (at a pressure of about 5 mm. Hg) to about 140° C. (at a pressure of about 100 mm. Hg). Azeotropic tower 36 has a bottom temperature of about 82° C. (at about 5 mm. Hg) to about 146° C. (at about 100 mm. Hg), and a top temperature of about 79° C. (at about 5 mm. Hg) to about 143° C. (at about 100 mm. Hg). Steam distillation towers 46 and 68 have temperatures ordinarily employed or reached in such distillations, namely 98° to 101° C.

The amount of benzyl alcohol used to form an azeotrope may vary from about 1 to 3 volumes per volume of cresol mixture being treated. It is preferred that about 1.5 volumes of benzyl alcohol be used per volume of cresol mixture.

What is claimed is:

1. The process of separating m-cresol and p-cresol which comprises subjecting a mixture containing same to distillation in the presence of benzyl alcohol and recovering an overhead predominating in p-cresol and benzyl alcohol along with a minor amount of m-cresol and a residue predominating in m-cresol and benzyl alcohol along with a minor amount of p-cresol.

2. The process in accordance with claim 1 in which the proportion of m-cresol to p-cresol in said mixture is between about 35/65 to 65/35.

3. The process in accordance with claim 2 in which said mixtures of m-cresol and p-cresol are obtained by separating a fraction thereof from a commercial mixture of same prior to distillation.

4. The process in accordance with claim 1 in which the amount of said benzyl alcohol is between about 1.0 and 3.0 volumes based on the total volume of said mixture of cresols.

5. The process in accordance with claim 1 in which said distillation is conducted under a vacuum of about 5 to 100 mm. Hg.

6. The process of separating m-cresol from p-cresol which comprises subjecting a mixture containing said cresols to distillation in the presence of benzyl alcohol in an amount sufficient to form azeotropes with both cresols, recovering an overhead predominating in p-cresol and benzyl alcohol along with a minor amount of m-cresol and recovering a residue predominating in m-cresol and benzyl alcohol along with a minor amount of p-cresol.

7. The process in accordance with claim 6 in which the proportion of m-cresol to p-cresol in said mixture is between about 35/65 to 65/35.

8. The process in accordance with claim 7 in which said mixtures of m-cresol and p-cresol are obtained by separating a fraction thereof from a commercial mixture of same prior to said distillation.

9. The process in accordance with claim 6 in which the amount of said benzyl alcohol is between about 1.0 and 3.0 volumes based on the total volume of said mixture of cresols.

10. The process in accordance with claim 6 in which said distillation is conducted under a vacuum of about 5 to 100 mm. Hg.

References Cited in the file of this patent

"Azeotropic Data," L. H. Horsley (1952 American Chemical Society), Washington, D.C.